(No Model.)
W. G. HOWE.
FEED BAG HOLDER.
No. 325,607. Patented Sept. 1, 1885.
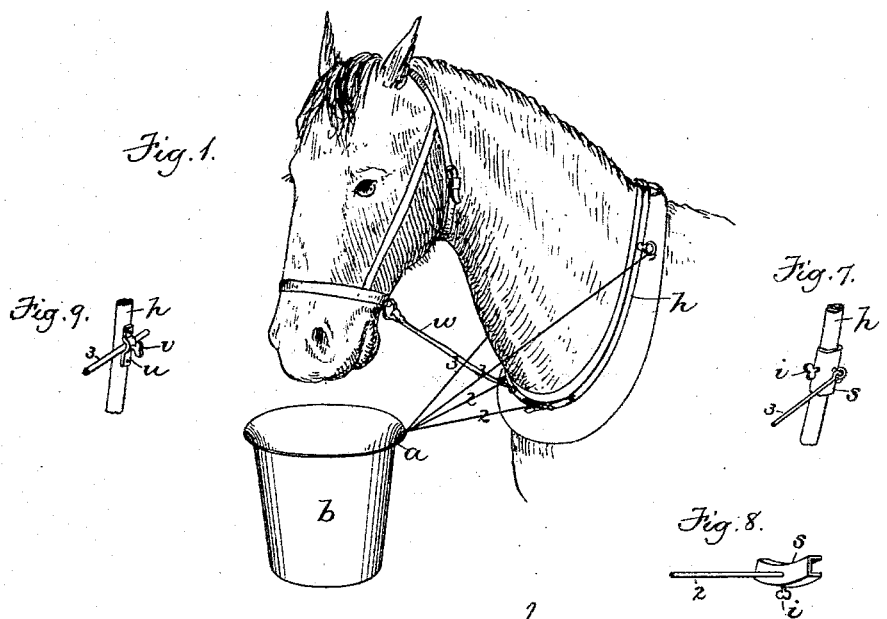
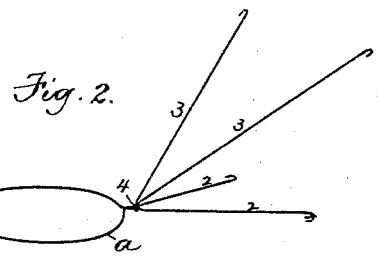
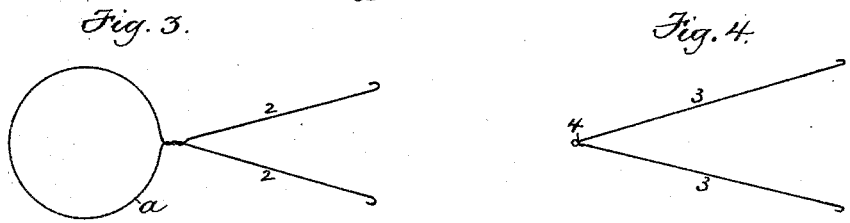
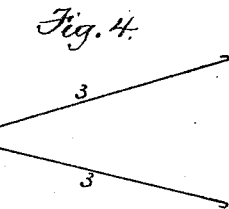
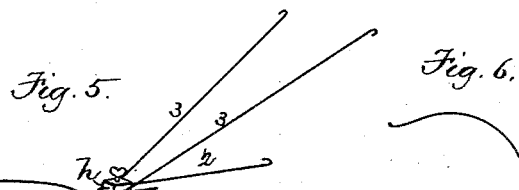
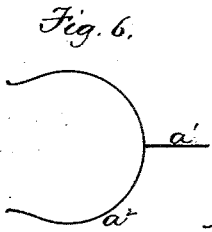
Witnesses.
H. Brown
Chas. S. Gooding.
Inventor.
W. G. Howe
by Wright & Brown
Attys.

United States Patent Office.

WILLIAM G. HOWE, OF BOSTON, MASSACHUSETTS.

FEED-BAG HOLDER.

SPECIFICATION forming part of Letters Patent No. 325,607, dated September 1, 1885.

Application filed August 11, 1884. (No model.)

*To all whom it may concern:*

Be it known that I, WILLIAM G. HOWE, of Boston, in the county of Suffolk and State of Massachusetts, have invented certain Improvements in Feed-Bag Holders, of which the following is a specification.

This invention has for its object to provide a simple and convenient device for supporting a feed-bag under a horse's nose, so that he can raise and lower his head independently of the feed-bag, and thus eat the feed more conveniently and avoid the dust in the feed, the waste of the feed caused by the movements given the feed-bag by the tossing of the horse's head being thus prevented.

The invention consists of a holder comprising a frame or ring adapted to surround or grasp the bag, and supports or braces extending from said ring and adapted to be secured to the hames or other part of the harness to hold the bag in position, as I will now proceed to describe.

Of the accompanying drawings, Figure 1 represents a perspective view of my improved holder applied to a horse and holding a feed-bag. Fig. 2 represents a perspective view of the holder detached, the bag being removed. Figs. 3 and 4 represent in plan the parts of the device shown in Fig. 2. Figs. 5, 6, 7, 8, and 9 represent modifications.

The same letters of reference apply to all the figures.

In the drawings, $a$ represents a ring or frame, preferably of stout wire and of suitable size to receive and support a feed-bag, $b$, of ordinary form, the mouth or upper end of the bag resting on said ring. The frame is provided with suitably-arranged supports or braces adapted to be attached to the hames $h$ or other portions of the harness, for the purpose of supporting the bag steadily under the horse's nose. Said supports may be variously constructed.

In Figs. 1 and 2 the supports are shown as composed of two rods or braces, 2 2, suitably secured to the frame $a$ and extending backwardly therefrom to the lower portions of the hames, and two additional rods or braces, 3 3, secured to the rods 2 2 and extending upwardly and backwardly to the upper portions of the hames. The rear ends of said rods may be bent to form hooks adapted to engage with eyes on the hames, or they may be otherwise secured to the harness in any suitable manner—for example, by means of flanged plates or sockets $s$, as shown in Figs. 7 and 8, said plates being formed to be placed on the hames $h$, and provided with set-screws $i$, whereby they may be secured to the hames, the rods 2 and 3 being secured to said plates in any suitable manner; or the hames may be provided with fixed sockets $u$, adapted to receive the rods 2 and 3, and provided with set-screws $v$ to secure said rods. (See Fig. 9.)

The frame $a$ and rods 2 2 may be formed from a single piece of wire, which may be twisted to form a connection between the rods at a point near the frame, the rods diverging and having sufficient elasticity to cause them to press outwardly at their rear ends when engaged with the eyes on the hames, thus holding themselves in engagement with said eyes. The rods 3 3 may also be made from a single piece of wire twisted to form a loop at 4, which receives the twisted portion connecting the rods 2 2, the rods 3 3 being adapted to hold themselves in engagement with the eyes or terret-rings on the hames by their tendency to spring apart or outward when engaged with said eyes.

In Fig. 5 the frame is shown as made in a separate piece and provided with a shank, $a'$. Only one rod 2 is employed, and this is connected with the shank $a'$ by means of a block, $h$, in which both the shank and rod are adjustable and to which they are secured by set-screws, which enable the distance at which the bag is supported from the horse's breast to be regulated. The rods 3 3 are made in separate pieces secured to the eyes on the block $h$.

It will be seen that either form of holder is adapted to be readily applied and removed, and securely hold the bag in a convenient position.

When removed the holder occupies but little space, and can be conveniently carried under the seat-cushion or elsewhere in a wagon or carriage.

My invention is not limited to the details above described, and they may be variously modified without departing from the spirit of the invention.

Instead of a ring, $a$, a U-shaped piece, $a^2$, may be employed as the frame, the same being adapted to grasp the bag and permit it to be inserted and removed sidewise. (See Fig. 6.) The braces 3 3 may be flexible cords or chains instead of rods.

Fig. 1 shows a strap or cord, w, connecting the halter or a nose-strap on the horse's head with the hames or collar, so that if the animal moves his nose forward the strap w will act as a check, and in many cases will be as effectual in preventing the horse from starting as a halter made fast to a fixed support would be.

I claim—

1. A feed-bag holder consisting of a frame formed to receive and hold the mouth of a feed-bag, the latter being separable from the frame, and supports connected to said frame and formed at their outer ends to engage with attachments on the harness, as set forth.

2. The improved feed-bag holder consisting of a frame, a, a rod or rods, 2, secured at one end to the frame and adapted to be detachably connected to the harness at the other end, and the rods or braces 3 3, secured to the rod or rods 2 and adapted to be engaged with the harness, as set forth.

In testimony whereof I have signed my name to this specification, in the presence of two subscribing witnesses, this 6th day of August, 1884.

WILLIAM G. HOWE.

Witnesses:
C. F. BROWN,
H. BROWN.